United States Patent [19]

Mara et al.

[11] 4,152,701

[45] May 1, 1979

[54] BASE BAND SPEED SENSOR

[75] Inventors: Richard M. Mara, Tewksbury; Alexander M. Nicolson, Concord; Gerald F. Ross, Lexington, all of Mass.

[73] Assignee: Sperry Rand Corporation, New York, N.Y.

[21] Appl. No.: 898,237

[22] Filed: Apr. 20, 1978

[51] Int. Cl.$^2$ .............................................. G01S 9/44
[52] U.S. Cl. ....................................................... 343/8
[58] Field of Search ............................................ 343/8

[56] References Cited

U.S. PATENT DOCUMENTS

| 3,118,139 | 1/1964 | Durstewitz | 343/8 |
| 3,143,734 | 8/1964 | Raabe | 343/9 |
| 4,068,207 | 1/1978 | Andermo et al. | 343/8 X |

*Primary Examiner*—Malcolm F. Hubler
*Attorney, Agent, or Firm*—Howard P. Terry

[57] ABSTRACT

A base band radio speed sensor, for use with the path of travel of the craft whose speed is to be sensed advantageously disposed at right angles to the antenna patterns, utilizes a transmitter flanked by equally spaced receivers for determining the times of passage of the craft with respect to symmetrically disposed receiver antennas.

12 Claims, 2 Drawing Figures

BASE BAND SPEED SENSOR

BACKGROUND OF THE INVENTION

1. Field of the Invention

The invention pertains to the transmission and reception of base band or sub-nanosecond electromagnetic signals relative to reflecting moving objects and more particularly relates to the use of such object-reflected signals for the measurement of the speed of moving objects.

2. Description of the Prior Art

In past systems for measuring the speed of a craft, it has been common practice to rely upon the Doppler shift of a reflected continuous wave carrier signal or upon other radio measures of the rate of change of the distance to the reflecting target, such as those involving use of automatic range tracking means in pulsed carrier systems. Such approaches are generally complex and costly, since they require the transmission of relatively high power levels of carrier energy. Such conventional methods also generally require the sensor system to direct high frequency radiation along the path of travel of the moving object or craft. Such a requirement dictates placement of the sensor within or at the end of the path of the craft, which is clearly dangerous, or which requires inconvenient compensation of the apparatus read-out for an angular off-set of the sensor from the path.

SUMMARY OF THE INVENTION

The invention relates to radio speed sensors of the kind radiating base band electromagnetic signals at right angles to the path of a moving craft, permitting the sensor system to be set back from the craft path in such a manner that it measures craft speed only when the craft is substantially directly in front of the sensor. A base band transmitter is flanked by receivers on each side of the transmitter. As the craft passes, the receivers are successively actuated, indicating craft presence at successive times, the interval being a function of craft speed.

DESCRIPTION OF THE PREFERRED EMBODIMENTS

Impulse or base band object detection and communication systems known in the past, such as those later to be referred to herein, are adapted for using very low-total-energy transmitted carrier-less sub-nanosecond electromagnetic impulses having a spectral content spread over a very wide band. Characteristically, they therefore make no significant contribution to the background electrical noise level and thus may operate well below noise levels interfering with ordinary government controlled radio transmissions. The base band transmitter of the combination is adapted to excite cooperating base band receivers of such a unique nature that the receivers are substantially unaffected by ambient noise and by ordinary pulse transmissions. Since the transmitter may operate with very low energy consumption, power supply size and cost are minimal. Further, with such low power operation, inexpensive components may find long life use throughout the transmitter. Cooperating receivers are similarly categorized, both the receiver and transmitter elements being of very simple nature and otherwise inexpensive of installation, operation, and maintenance, adapting readily to use with conventional intelligence input and output equipment. It will be seen that the invention is therefore particularly benefitted by the use of base band signals, transmitted and actually reflected only when the craft whose speed is to be sensed is passing at short range in front of the sensor system.

Figure 1:
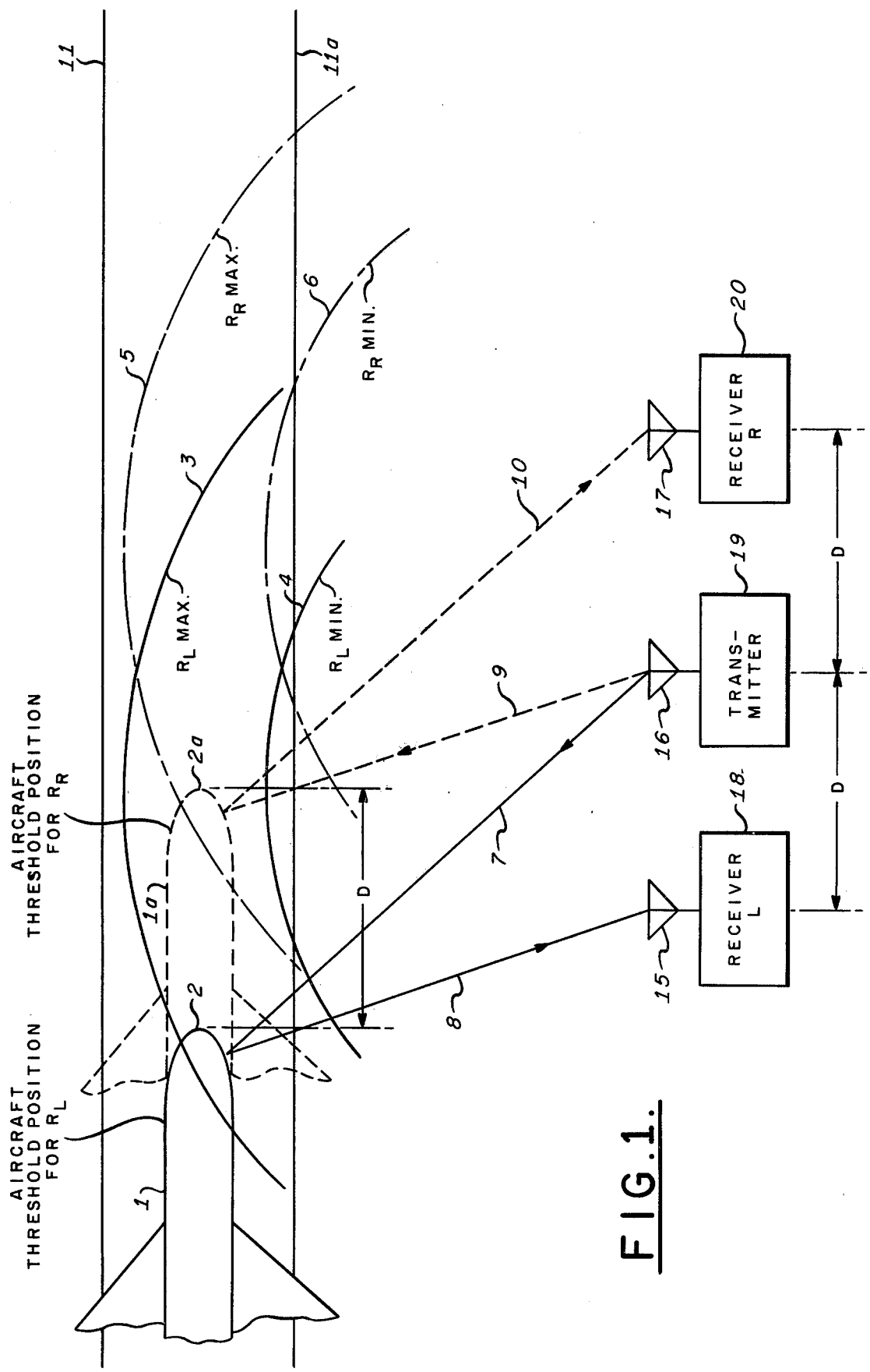
FIG. 1 is a plan view illustrating the placement of the novel radio speed sensing system with respect to the path of a craft.

The invention is used, for example, in the situation illustrated in FIG. 1 wherein it is desired to measure the speed of a vehicle such as an automobile or aircraft traveling above or on a road or runway defined by roadway edges 11, 11a. In practice, the speed measurement is made by radio apparatus viewing the craft or vehicle 11 from one side of its path 11, 11a as it passes the measurement site, rather than viewing the craft from a remote end of its path.

In general, the arrangement of FIG. 1 illustrates use of the novel speed meter at the edge of an aircraft runway, though speed in other directions, including vertical speed, may be measured. A base band transmitter 19 with a moderately direction antenna 16 is flanked on either side by identical left and right base band receivers 18 and 20 with respective associated antennas 15 and 17 spaced at equal distances D from transmitter antenna 16. Antennas 15, 16, and 17 may be similar, but antennas 15 and 17 will normally be identical. The effective centers of radiation of the two receiver antennas 15, 17 will be placed on a line parallel to the edge 11a of the runway; antenna 16 will generally be similarly situated.

In operation, the transmitter antenna 16 radiates a base band pulse, and this pulse is reflected from scattering elements such as the fuselage of craft 1. Two methods of operation are possible: the rising amplitude scattered response itself may be employed to determine the onset of detection, or range gating may be used.

In the first of the two possible modes, receivers 18, 20 are range gated so that they are sensitive to a reflected signal at any range lying between $R_{MAX}$ and $R_{MIN}$ as defined in FIG. 1. For example, the loci 3 and 4 of the respective $R_{MAX}$ and $R_{MIN}$ values of range for the left receiver 18 actually span runway 11, 11a. Receivers 18, 20 operate as threshold detectors, sensitive to the low level reflected signals involved and producing a quantized and enhanced output as soon as an above-threshold reflection is detected.

The scattering pattern of an aircraft is such that the reflected signal, principally from the fuselage as the aircraft proceeds along the runway, is small until the craft is nearly abreast of transmitter antenna 16. Thus, the craft may actually be within the range gate $R_{MAX} - R_{MIN}$ for some time before the occurrence of the abrupt increase in returned signal amplitude which occurs when the craft fuselage is almost normal to the symmetrically disposed axis of the radiation pattern of transmitter antenna 16. Because receiver antennas 15, 17 are spaced apart equal distances D from transmitter antenna 16, the rapid increase in signal amplitude above the threshold value does not occur simultaneously at both receivers, but at times corresponding to the positions 2 and 2a of the aircraft nose. For example, in FIG. 1, detection will occur in receiver 18 along radiation path 7, 8 before it occurs in receiver 20 along radiation paths 9, 10. With identical threshold characteristics in both receivers 18, 20, they will indicate target presence at successively different times, the time interval between the two detections being proportional to craft speed. When the two consequent quantized outputs are fed into a device for measuring their time separation, calibrated according to the separation of receiver antennas 15, 17, craft speed may be accurately displayed.

The first mode of operation is generally preferred for the measurement of aircraft speed on or just above a runway, since the signal returned by certain types of craft rises smoothly and rapidly as the craft moves along a runway. The second mode may be preferred for vehicles which normally have a multiplicity of scattering centers, including such centers at the front of the vehicle, as is more generally characteristic of automobiles. In the latter case, the return sensed by receivers 18, 20, may increase erratically over a few tenths of a second. In this second possible mode, the range gate outer boundary is moved toward the inner boundary, for example, so that the range gate width is diminished. Now, the outer boundary of the range gate determines the instant of increase in signal level, rather than merely the approach of the target. Detection of the resultant more precisely defined instant is achieved at the entirely tolerable expense of reduced coverage of the total width of the roadway.

Figure 2:
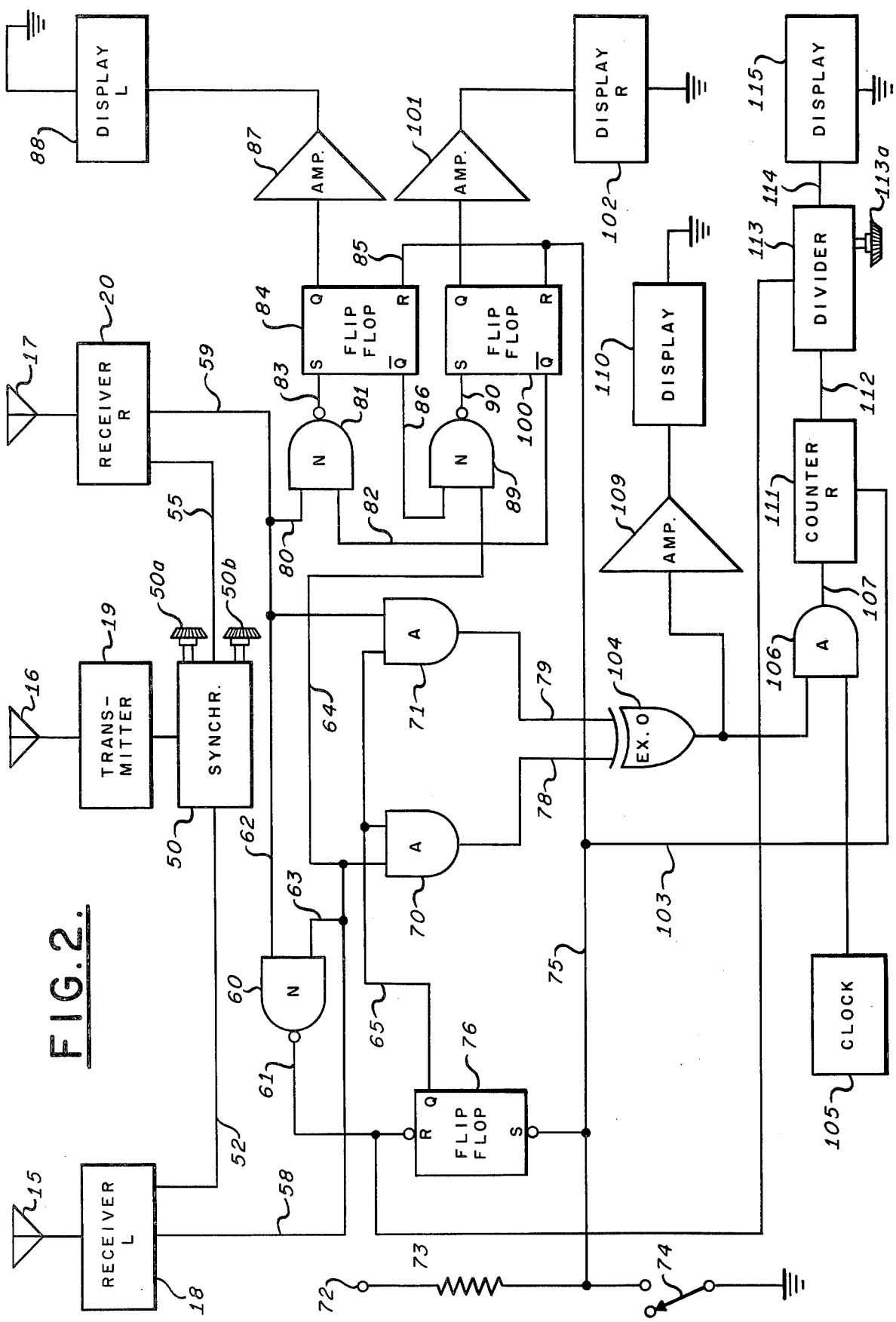
FIG. 2 is a wiring diagram illustrating the electrical components used in the invention and their interconnections.

In the form of the invention illustrated in FIG. 2, the base band transmitter 19, base band receivers 18 and 20, and their respective associated non-dispersive directive antennas 16, 15, and 17 are again perceived. The base band transmitter 19 may take any of several known forms, including the form shown in the C. C. Wang U.S. Pat. No. 3,832,568 for a "Circuit for Generating a Single High Voltage Subnanosecond Pulse from a Step Recovery Diode", issued Aug. 27, 1974 and assigned to Sperry Rand Corporation. This and the transmitter system disclosed in the G. F. Ross and D. Lamensdorf U.S. Pat. No. 3,659,203 for a "Balanced Radiation System", issued Apr. 25, 1972 and also assigned to Sperry Rand Corporation, disclose concepts that readily yield trains of base band pulses at predetermined pulse repetition rates. Such base band transmitters and others known in the art are readily synchronized by devices such as the pulse train synchronizer 50, which device also readily repetitively generates corresponding trains of range gate pulses, the phasing of the gates and their duration being readily adjusted to fit the needs of a particular site, as by the respective conventional manual controls 50a, 50b.

The range gates may for example, be coupled via leads 52 and 55 for use within the respective base band receivers 18 and 20 for target range selection in the conventional manner. Receivers for base band signals operating in the required manner are disclosed in several places in the prior art, including the following patents to G. F. Ross, also assigned to Sperry Rand Corporation:

U.S. Pat. No. 3,728,632 for "Transmission and Reception System for Generating Received Base-Band Duration Pulse Signals Without Distortion for Short Base-Band Pulse Communication System", issued Apr. 17, 1973, U.S. Pat. No. 3,750,025 for "Energy Amplifying Selector Gate for Base-Band Signals", issued July 31, 1973, and U.S. Pat. No. 3,971,990 for "Base Band Pulse Object Sensor System", issued July 27, 1976.

A preferred receiver is disclosed in the A. M. Nicolson, R. M. Mara U.S. Pat. No. 3,983,422 for a "Detector Having a Constant False Alarm Rate", issued Sept. 28, 1976 and similarly assigned.

The system of FIG. 2 is set up for operation in the normally open state of switch 74, which when manually closed is coupled in series with limiting resistor 73 and terminal 72 to a suitable unidirectional power supply (not shown). The junction between switch 74 and resistor 73 is coupled to the inverting set terminal of a conventional flip flop 76, and also to reset terminals of conventional flip flops 84, 100 and counter 111 whose functions remain to be described.

Any return exceeding the threshold of receiver 18 and lying within its range gate is passed via lead 58 to a first input of AND gate 70 as an amplified and lengthened pulse. If a subsequent input to the second receiver 20 exceeds the same threshold value, a first input is supplied as a similarly amplified and lengthened pulse to AND gate 71 via lead 59. Assuming that flip flop 76 has been set, its Q output is a one, and this enabling signal is coupled via lead 65 to second inputs of AND gates 70, 71. The presence of this enabling signal and of one of the receiver outputs at one of the AND gates produces an input for the conventional EXCLUSIVE OR gate 104. Thus, when an enhanced target recognition signal appears at the output of either receiver 18, 20, the output of EXCLUSIVE OR gate 104 enables AND gate 106. This event allows clock pulses from clock 105 to flow into the conventional pulse counter 111.

Now, when the target moves to the point at which it produces an enhanced above-threshold output from the second receiver 20, there are target presence identifying signals on both inputs 78, 79 flowing into EXCLUSIVE OR gate 104, so that it yields no output. Consequently, AND gate 106 is closed and no further clock pulses pass via lead 107 to counter 111. The count in the conventional counter 111 is representative of the time it took the craft to move across the effective field of view of the measurement system. Counter 111 may ultimately be reset by closure of switch 74 to supply a reset signal via leads 75, 103 to the reset lead of counter 111.

When both target presence identifying signals appear at the inputs of AND gates 70, 71, they are also respectively coupled via leads 62, 63 to the two inputs of a conventional NAND gate 60, whose output on lead 61 is coupled to the reset inversion input of flip flop 76, eliminating the generation by the latter of further enabling Q pulses on lead 65. The count within counter 111 is then shifted into divider 113, whose operating sequence is initiated by again using the output of NAND gate 60 via leads 61, 77. The output of EXCLUSIVE OR gate 104 is also coupled via lead 108 to a conventional amplifier 109 for operating display 110 only while counter 111 is actually counting. Thus, the count in counter 111 and the period of illumination of display 110 both correspond to the time required for the target to move between receiver threshold points. Amplifier 109 may contain conventional means for direct current restoration, if desired for operation of a display 110 in the form of an incandescent lamp, which may be a light emitting diode. It will be understood by those skilled in the art that other displays may be used along with or in lieu of lamp 110.

If the timing pulse train generated by clock 105 has a repetition frequency $f_c$, then the total count C stored in counter 111 for a time $\Delta t$ is:

$$C = f_c \Delta t \quad (1)$$

Velocity of the craft is:

$$V = D \cdot f_c / C \quad (2)$$

or $$V = k/C \quad (3)$$

Divider 113 is therefore a simple digital or analog divider circuit capable of using the count output of counter 111 on lead 112 and of dividing it by a constant k which depends upon the selected value of D and may be manually set in, for example, by adjustment 113a. In a typical system, D=20 feet and f=$10^5$ Hz, so that k=$2 \times 10^6$ ft/sec. The output of divider 113 is coupled via lead 114 to a conventional display 115 which may contain a suitable conventional interface for adapting the display 115 for operation with divider 113. Display 115 may directly read out speed in miles per hour, if desired.

The first receiver of receivers 18, 20 to detect the target causes display 88 or 102 to operate, but not both. For this purpose, NAND gates 81, 89 and flip flops 84, 100 are provided. The output of receiver 18 is connected by leads 58, 64 to a first input of NAND gate 89. Likewise, the output of receiver 20 is coupled via leads 59, 80 to a first input of NAND gate 81. The respective outputs of NAND gates 81, 89 go via leads 83, 90 to the set inputs of flip flops 84, 100. The $\overline{Q}$ output of flip flop 84 is connected via lead 86 to a second input of NAND gate 89. Likewise, the $\overline{Q}$ output of flip flop 100 is connected via lead 82 to a second input of NAND gate 81. The respective Q outputs of flip flops 84, 100 are supplied to individual amplifiers 87, 101 which, in turn, operate respective displays 88, 102. The latter displays may be similar to display 110.

If receiver 18 is the first to detect the target, flip flop 100 is set by the output of NAND gate 89, the Q output of flip flop 100 operates indicator 102. In the mean time, operation of display 88 is inhibited by the $\overline{Q}$ output of flip flop 100 at a first input of NAND gate 81, preventing flip flop 84 from being set. In any event, the first of receivers 18, 20 to detect the target sets one or the other of flip flops 84, 100, illuminating the appropriate indicator 102 or 88, preventing the other flip flop 84 or 100 from being set by disabling either NAND gate 81 or 89. Display 88 or display 102 continues to operate until flip flop 84 or 100 in reset via leads 75, 85 by the operation of switch 74. If the craft is moving to the left on its path, display 88 is illuminated. If it is moving to the right, display 102 is illuminated.

Accordingly, it is seen that the invention readily overcomes the many difficulties inherent in prior systems, where it was disadvantageously required that the radio speed sensor be sighted essentially along the line of travel of the craft whose speed was to be measured. The sensor is light in weight and consumes little power. It constitutes a small volume device that is readily installed safely at one side of the runway or road. Its operation is independent of the direction of motion of the craft along its normal path and an indication of the sense of travel along that path is given. Operation at low level is particularly practical in the present application, being such that it is not interfered with by other radio systems operating in the vicinity and does not interfere with their operation. In measurements for detecting automotive speed law violations, no energy reaches the vehicle until the very instant at which measurement is made; thus, the motorist has no warning of the presence of a hidden monitor and cannot take evasive measures.

While the invention has been described in its preferred embodiment, it is to be understood that the words which have been used are words of description rather than of limitation, and that changes may be made within the purview of the appended claims without departing from the true scope and spirit of the invention in its broader aspects.

What is claimed is:

1. Apparatus for measuring the speed of a craft moving along a predetermined path comprising:
   base band transmitter means disposed adjacent said path for illuminating said craft as it moves past said base band transmitter means,
   first and second base band receiver means disposed in equally spaced relation from said base band transmitter means and from said path for producing first and second time-displaced outputs,
   first NAND gate means responsive for producing an output in the presence of only one of said time-displaced outputs,
   first and second coincidence means respectively responsive to said time-displaced outputs and also to said first NAND gate output,
   gate means for producing a timing output initiated by the first of said time-displaced outputs and ended by the second of said time-displaced outputs,
   clock means for producing clock pulses,
   counter means for establishing a count of said clock pulses during said timing output,
   divider means for converting said count into signals representative of the average speed of said craft during said timing output, and
   first display means for displaying said speed representation independently of the direction of motion of said craft along said path.

2. Apparatus as described in claim 1 additionally including:
   synchronizer means for establishing the pulsed repetition rate of said base band transmitter means,
   said synchronizer means being characterized by including means for range gating said first and second base band receiver means.

3. Apparatus as described in claim 1 further including bistable pulse generator means responsive to said first NAND gate means by changing state in the presence of only one of said time-displaced outputs whereby said first NAND gate output is quantized.

4. Apparatus as described in claim 1 wherein said gate means comprises:
   EXCLUSIVE OR gate means respectively responsive to said first and second coincidence means, and
   AND gate means responsive to said EXCLUSIVE OR gate means and to said clock means,
   said counter means being additionally responsive to said AND gate means.

5. Apparatus as described in claim 4 additionally including second display means responsive to said EXCLUSIVE OR gate means for display of the duration of the counting of said counter means.

6. Apparatus as described in claim 4 additionally including set means for setting said bistable pulse generator means.

7. Apparatus as described in claim 4 additionally including means for resetting said counter means.

8. Apparatus as described in claim 4 additionally including means whereby operation of said divider means is initiated in response to said first NAND gate means.

9. Apparatus as described in claim 1 additionally including:
second and third NAND gate means,
first and second bistable means,
said second NAND gate means having a first input responsive to said first base band receiver means and a second input responsive to a first output of said second bistable means,
said third NAND gate means having a first input responsive to said second base band receiver means and a second input responsive to a first output of said first bistable means,
said first bistable means being responsive to said second NAND gate means,
said second bistable means being responsive to said third NAND gate means.

10. Apparatus as described in claim 9 additionally including second display means responsive to a second output of said second bistable means for indicating a first direction of motion of said craft along said path.

11. Apparatus as described in claim 10 additionally including third display means responsive to a second output of said first bistable means for indicating a second direction of motion opposite to said first direction of motion of said craft along said path.

12. Apparatus as described in claim 11 including means for resetting said first and second bistable means.

* * * * *